United States Patent [19]

Altman

[11] 4,252,056
[45] Feb. 24, 1981

[54] AUTOMATIC MULTIPLE STEP SEQUENCING APPARATUS

[76] Inventor: James E. Altman, 105 Altman Rd., Gray, Ga. 31032

[21] Appl. No.: 958,175

[22] Filed: Nov. 6, 1978

[51] Int. Cl.³ .......................... A23N 4/02; A23N 4/12; A47J 25/00
[52] U.S. Cl. ...................................... 99/551; 99/544; 99/564; 99/637
[58] Field of Search ................. 99/544, 547, 551, 637, 99/559–561, 564–566

[56] References Cited

U.S. PATENT DOCUMENTS

| | | | |
|---|---|---|---|
| 2,567,591 | 9/1951 | Ashlock, Jr. | 99/561 |
| 2,683,477 | 7/1954 | Altman | 99/546 |
| 2,688,993 | 9/1954 | White | 99/544 |
| 2,835,294 | 5/1958 | Rigney | 99/544 |
| 3,151,648 | 10/1964 | Wilbur et al. | 99/564 |
| 3,434,517 | 3/1969 | Durand, Jr. et al. | 99/544 |
| 3,563,289 | 10/1968 | Altman | 99/563 |
| 3,612,124 | 10/1971 | Cunningham et al. | 99/547 |

Primary Examiner—Harvey C. Hornsby
Assistant Examiner—Timothy F. Simone
Attorney, Agent, or Firm—Hill, Van Santen, Steadman, Chiara & Simpson

[57] ABSTRACT

Apparatus for performing a plurality of successive operations simultaneously at each one of a plurality of work stations arranged in a row, each station accommodating a fruit piece, or the like, such as a citrus fruit member. The fruit pieces are sequentially advanced to the work stations in a stop and go movement utilizing a closed loop conveyor system. At the working stations, a pair of pneumatically operated reciprocally movable carriages, which are provided with suitable processing apparatus, sequentially move towards and away therefrom. These carriages ride on linear bearing bars. For example, coring and core removal can be accomplished at all stations.

7 Claims, 15 Drawing Figures

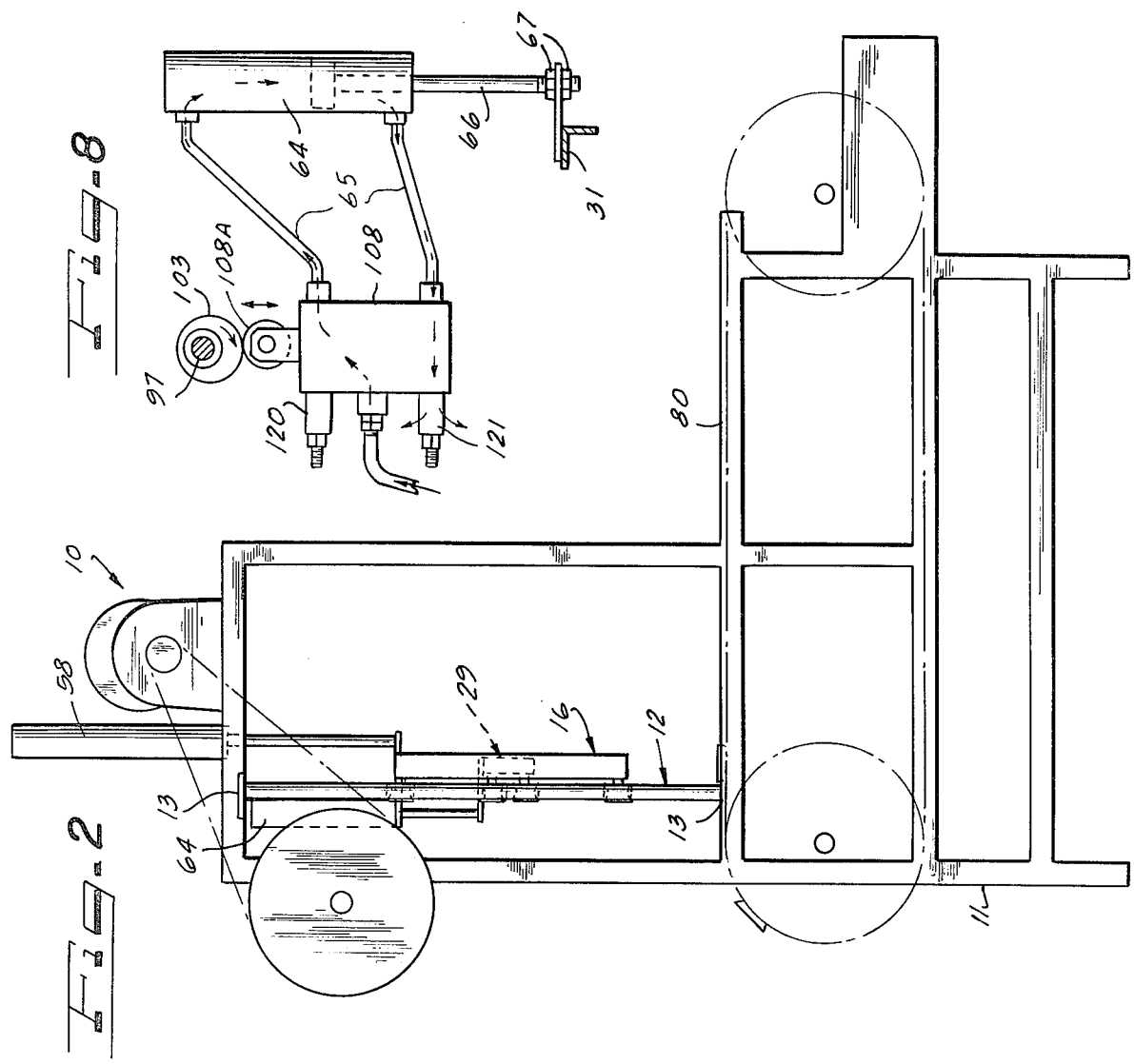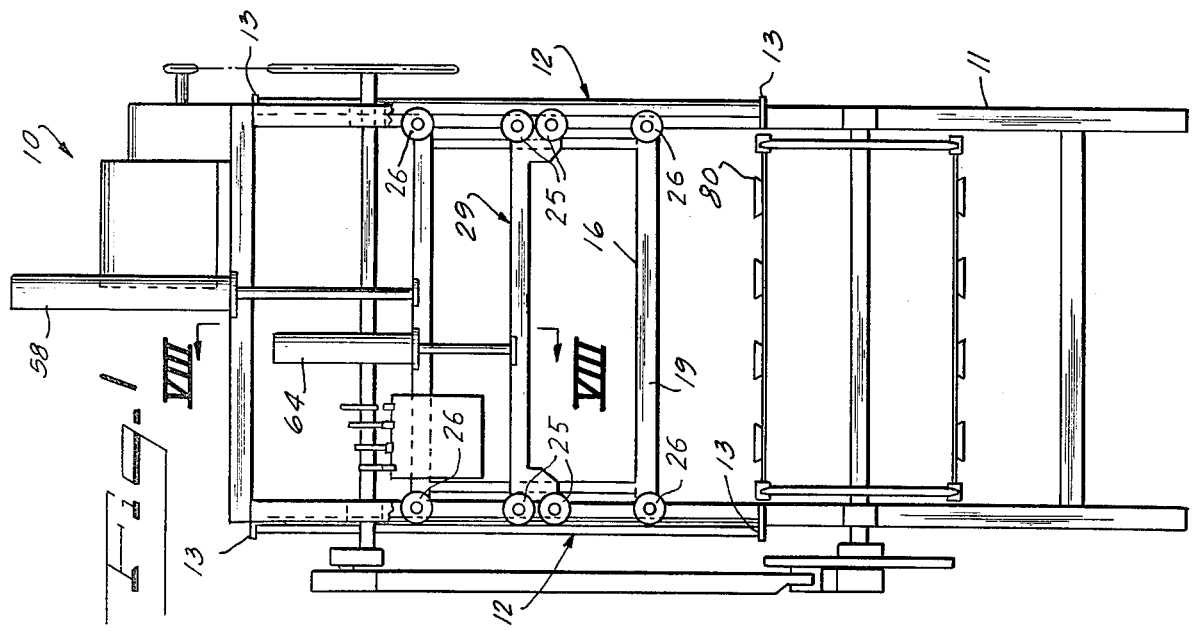

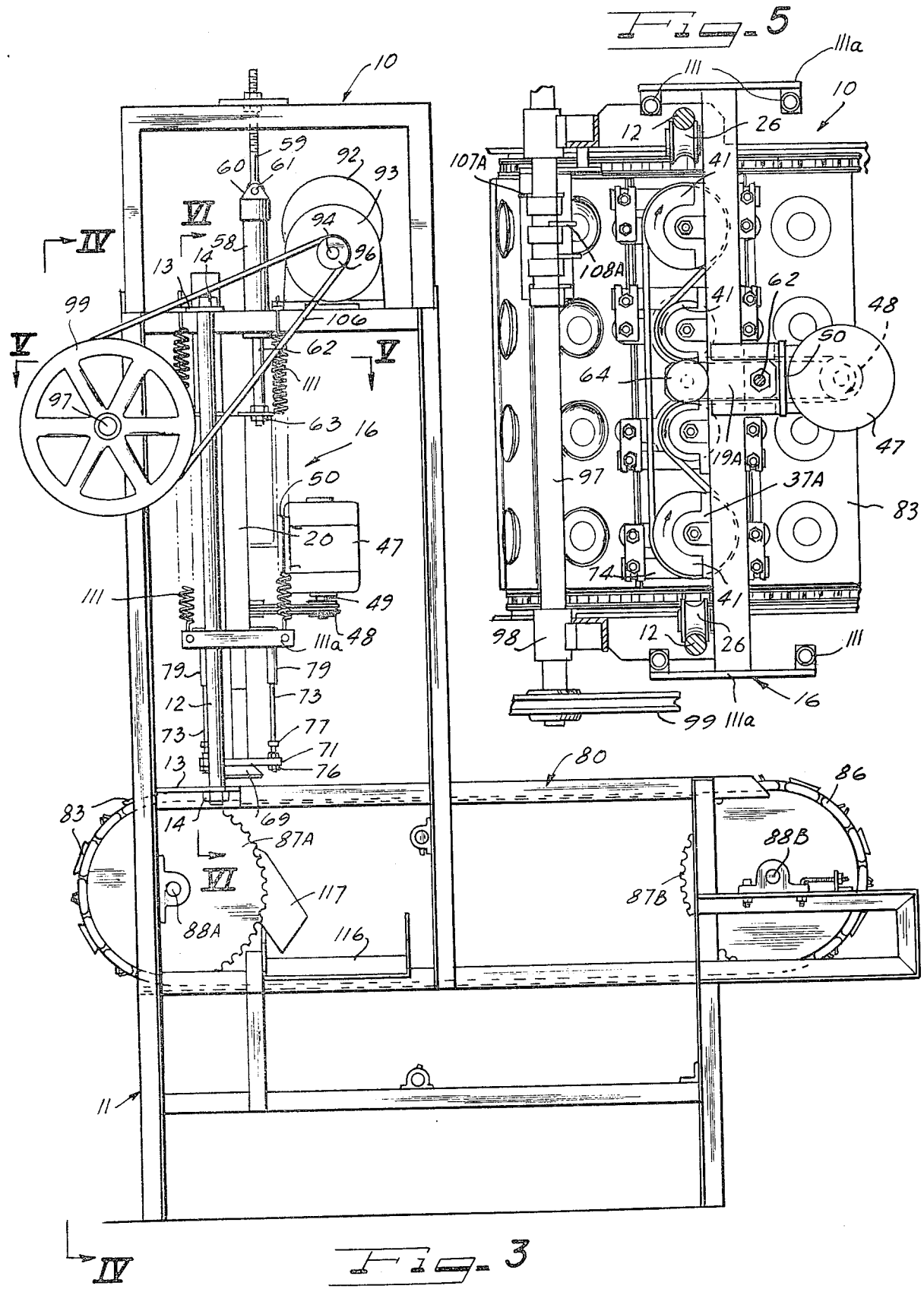

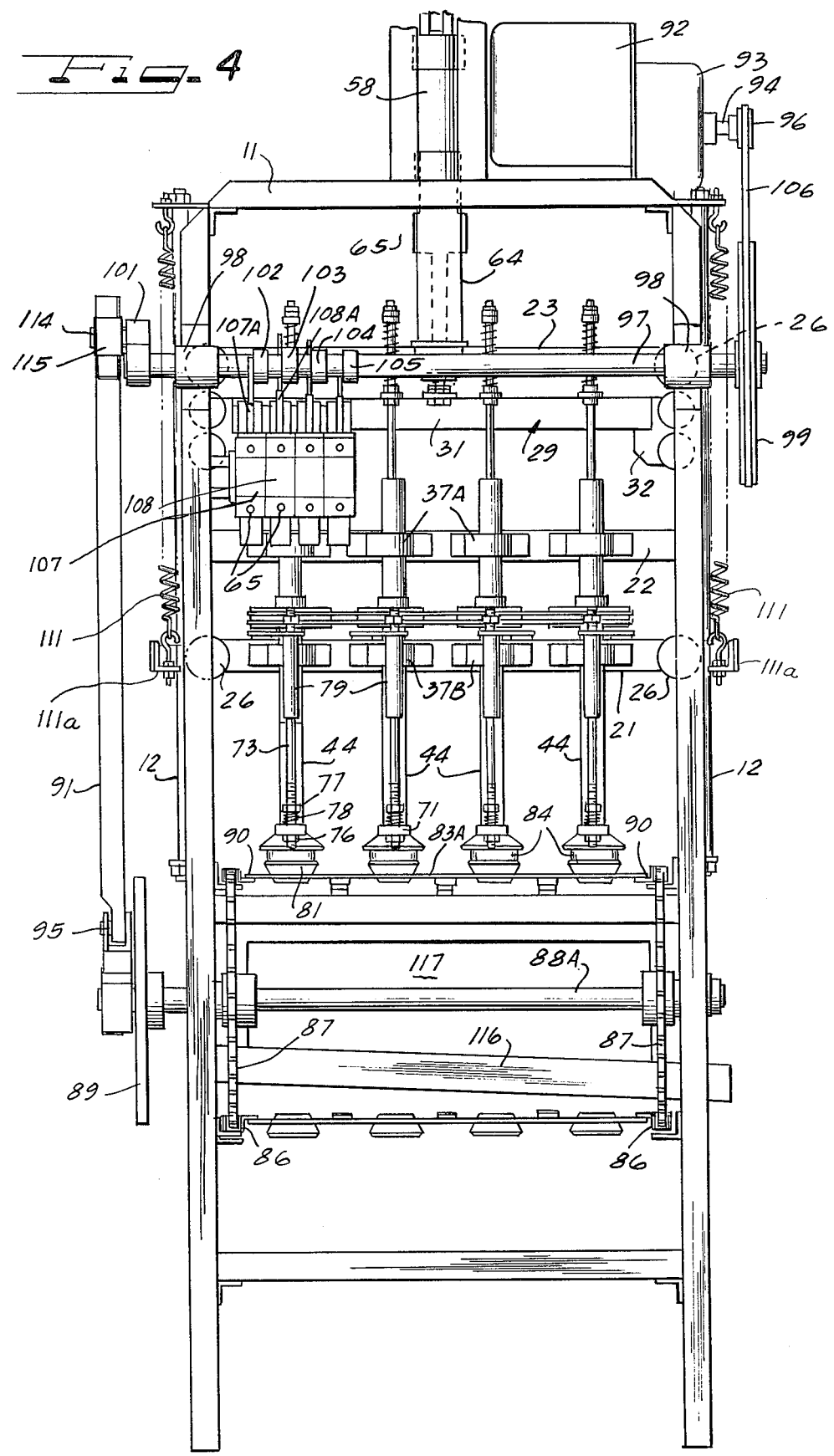

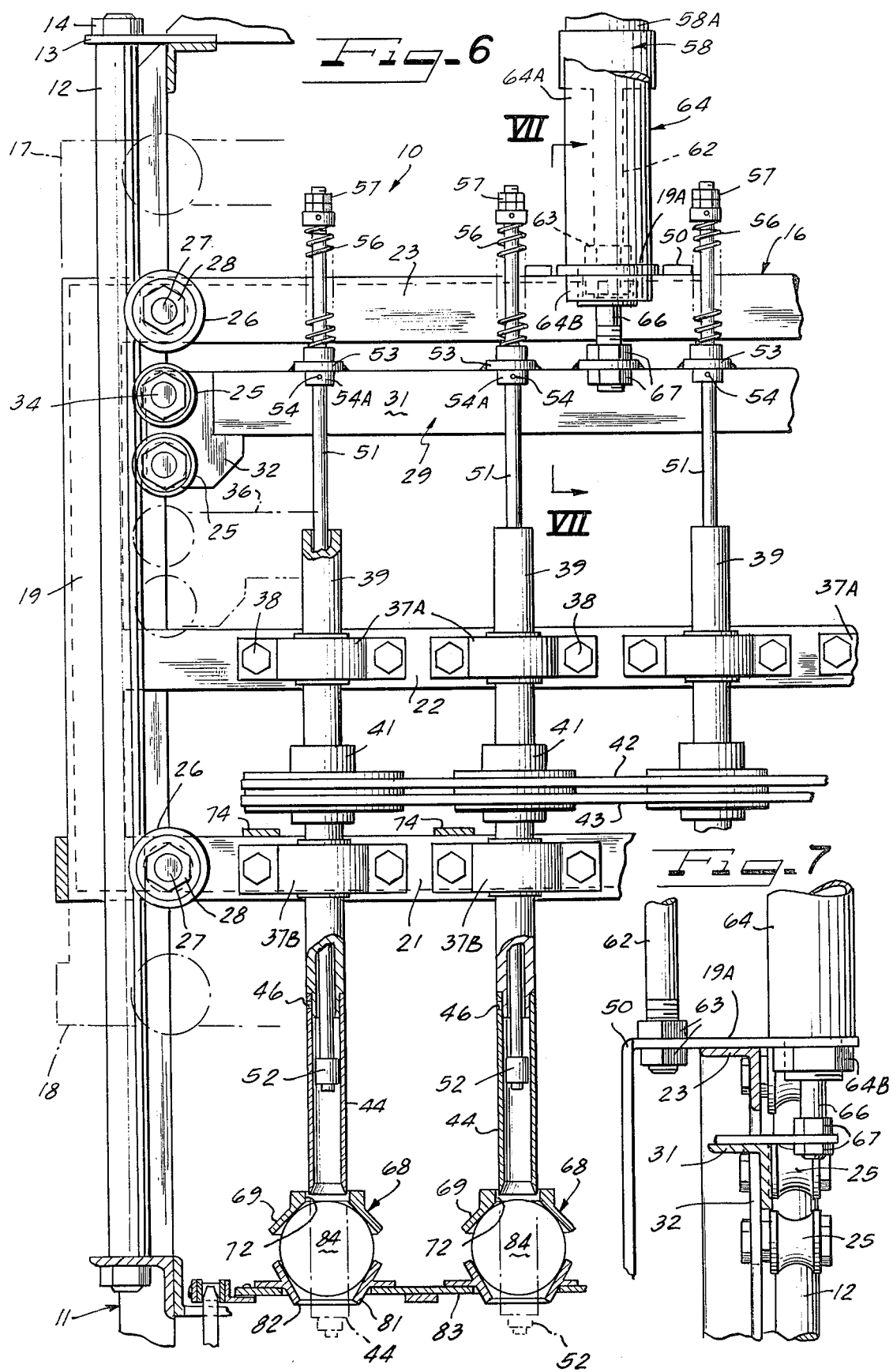

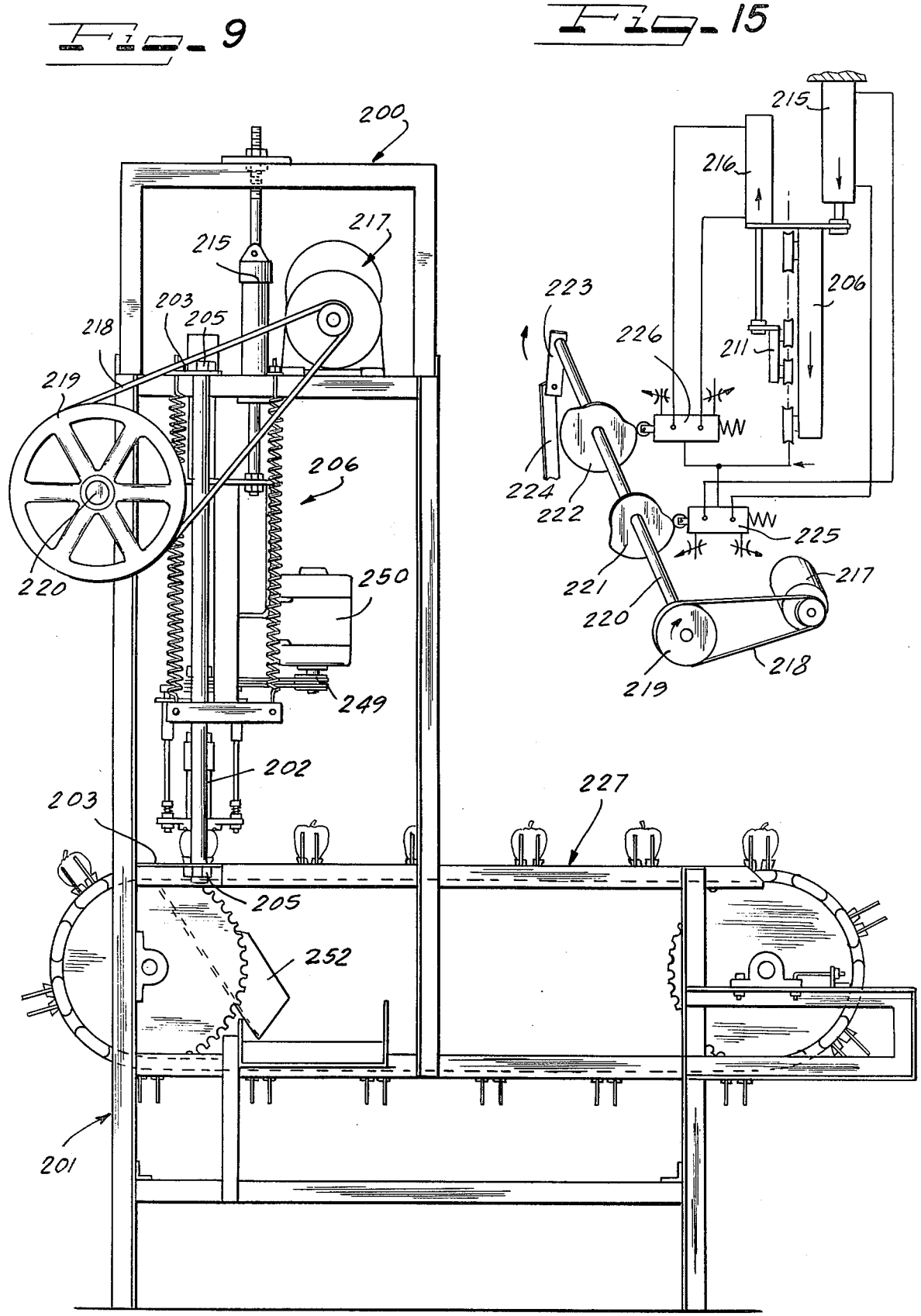

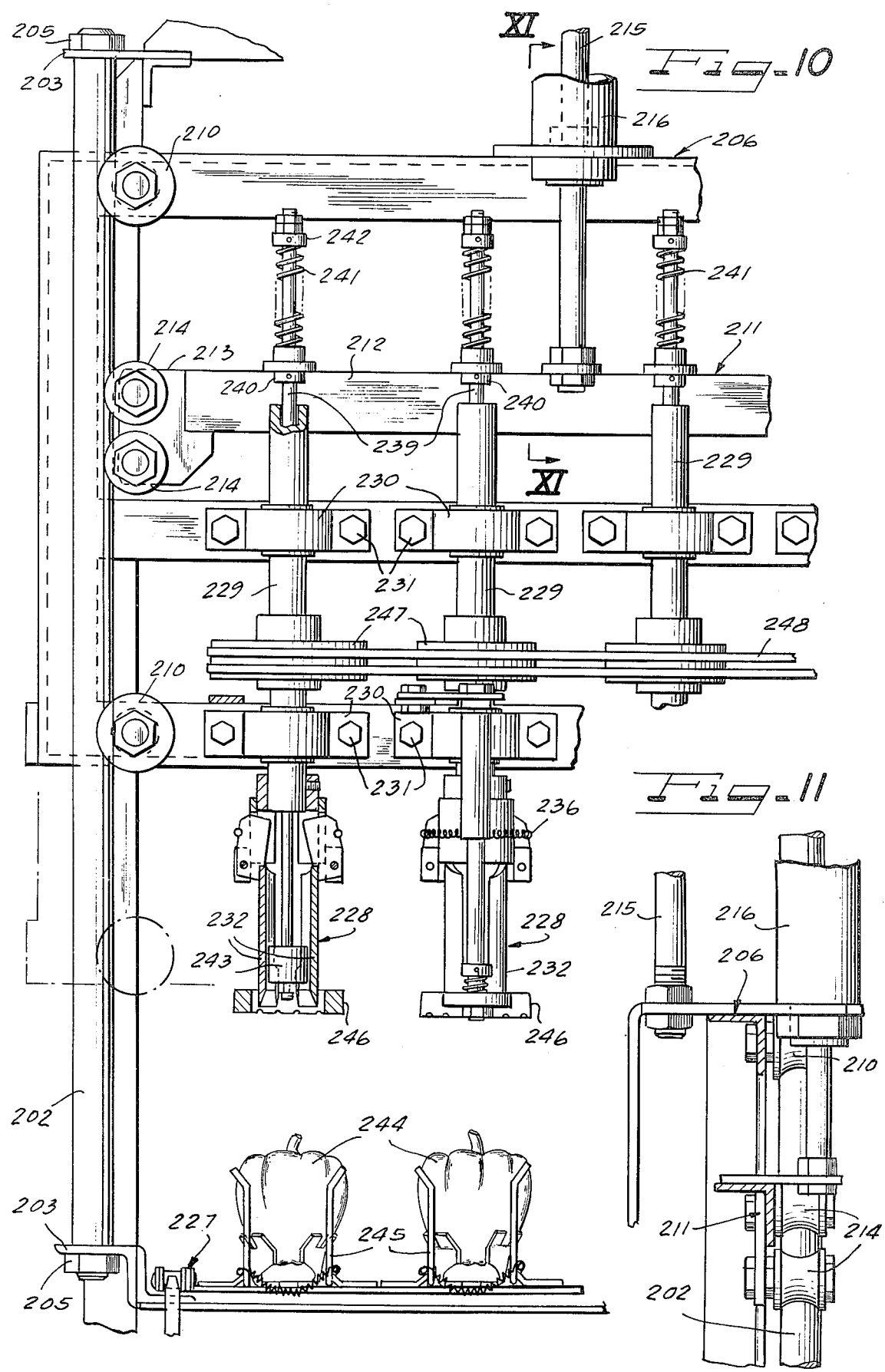

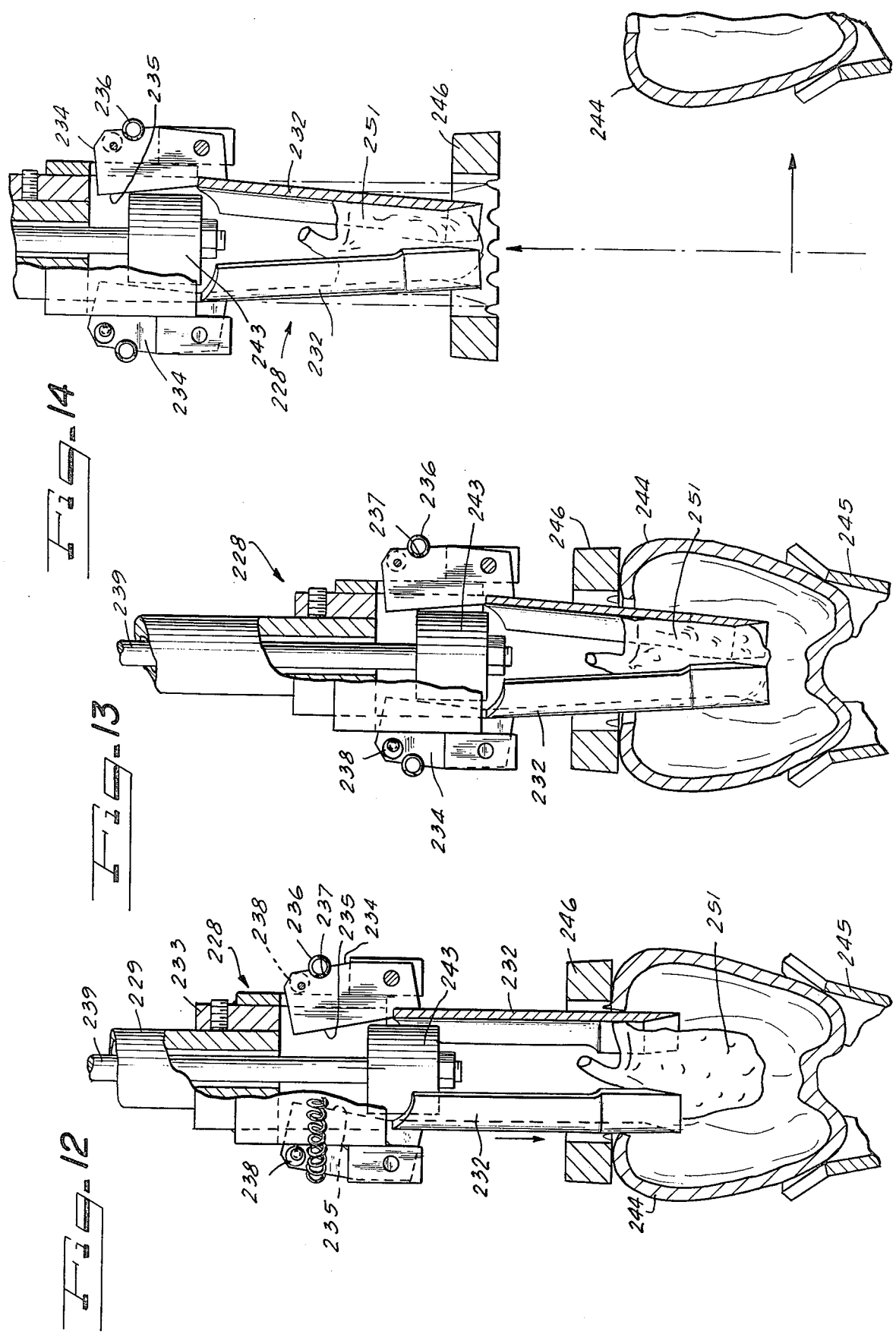

AUTOMATIC MULTIPLE STEP SEQUENCING APPARATUS

BACKGROUND OF THE INVENTION

In the art of processing machinery, especially fruit processing machinery, there is a need for apparatus which will perform automatically a plurality of successive operations simultaneously at each one of a plurality of stations arranged in a row. Each station accomodates, for example, a single fruit piece, such as a citrus fruit member, a bell pepper, or the like. Furthermore, before, and then after, such operations have been carried out, the apparatus should first advance, and then subsequently remove, the processed fruit pieces from such stations, and also advance new fruit pieces into such stations automatically.

Contrivances heretofore known which are supposed to perform this type of operating sequence, so far as known to me, have all involved relatively complex mechanical assemblies which have a number of deficiencies. For one thing, the components in such assemblies must be carefully fabricated and assembled from a plurality of individual elements, causing inherently significant manufacturing costs. For another thing all-mechanical such assemblies tend to involve cumbersome components which can wear excessively, necessitating significant and regular (relative to periods of machine operation) maintenance. For another thing, all mechanical such assemblies can become slightly disaligned, or out of operational synchronism, or the like, which can accelerate wear and maintenance problems. For another thing, all-mechanical such assemblies characteristically have only a limited number of machine operating capabilities.

Once such a machine is designed and built, for example, its operational sequences, timing, and movement limits are determined, for all practical purposes, so that adjustments, variations, such as variations in individual cycles of operation, or variations in operational sequences, or the like, cannot be achieved.

Machines are needed which overcome such disadvantages and shortcomings.

BRIEF SUMMARY OF THE INVENTION

There has now been discovered new and improved apparatus for performing reliably and economically a plurality of sequential functions simultaneously at each of a row of stations to which fruit or the like is sequentially advanced.

The apparatus of this invention is relatively simple, and provides a capacity to perform automated coring of a multiplicity of fruit pieces in a reliable manner, economically, for an extended period of machine operation, and with a minimum of machine servicing and maintenance problems.

In one aspect this invention provides in an automatic processing system apparatus for fruit members.

In another aspect this invention provides in an automatic fruit processing apparatus mechanism adapted for fruit coring and core removal with fruit advancing apparatus.

In another aspect, this invention provides apparatus incorporating a plurality of coacting subassemblies. Thus, the coring apparatus of this invention incorporates as a subassembly a reciprocation mechanism for supporting operably coring apparatus and core removal apparatus for each of a plurality of fruit pieces or the like simultaneously at each of a row of work stations. This apparatus further incorporates as a subassembly a sequentially advancing mechanism for moving rows of fruit holders to, and then later from, such row of work stations. This apparatus also incorporates as a subassembly a control apparatus for timing relative to one another the various machine process sequences involved.

Other and further objects, aims, purposes, features, advantages, techniques, and the like, will be apparent to those skilled in the art from the present specification taken together with the accompanying drawings.

BRIEF DESCRIPTION OF DRAWINGS

In the drawings:

FIG. 1 is an end elevational view in a partially diagrammatic form illustrating one embodiment of apparatus of the present invention;

FIG. 2 is a side elevational view of the apparatus shown in FIG. 1;

FIG. 3 is a detail-type side elevational view of one embodiment of an automatic, multiple-row, synchronized coring apparatus of the present invention;

FIG. 4 is a view taken generally along the line IV—IV of FIG. 3;

FIG. 5 is a transverse sectional view taken along the line V—V of FIG. 3;

FIG. 6 is a view taken along the line VI—VI of FIG. 3, some parts thereof broken away, and some parts thereof shown in section;

FIG. 7 is a view taken along the line VII—VII of FIG. 6 and showing a detailed view of the connection of the elevating cylinder used for reciprocatorily moving the carriage assembly up and down;

FIG. 8 is a diagrammatic, fragmentary, enlarged, detail view in side elevation taken through the region VIII—VIII of FIG. 1 illustrating the cam actuation of one pneumatic cylinder used for subassembly reciprocation in a preferred mode of practicing this invention;

FIG. 9 is a view similar to FIG. 3, but showing an alternate embodiment of the invention;

FIG. 10 is a view similar to FIG. 6, but showing the FIG. 9 embodiment;

FIG. 11 is a view taken generally along the line XI—XI of FIG. 10;

FIG. 12 is a side elevational view with portions thereof broken away showing the interior of the core removal mechanism employed in the embodiment of FIG. 9;

FIGS. 13 and 14 are each similar to FIG. 12, but illustrate sequentially further operational positions and modes assumed by the coring mechanism depicted in FIG. 12 during the operation of the FIG. 9 embodiment in coring a bell pepper; and FIG. 15 is a schematic diagram of a fluid operating system employed in the operation of the embodiment of FIG. 9.

DETAILED DESCRIPTION

Referring to the drawings, especially FIGS. 1 and 2, there is seen an embodiment of an automatic synchronized multiple station coring apparatus of the present invention which is herein for convenience designated in its entirety by the numeral 10. Apparatus 10 incorporates a frame 11 formed of angle iron sections, or the like, which are welded together, or the like, at positions of jointure. Frame 11 supports and rigidly mounts a pair of cross-sectionally circular track bars 12, each bar 12 being in spaced, parallel relationship to the other thereof. In apparatus 10, bars 12 are normally vertical. For purposes of mounting bars 12 to frame 11, each bar 12 is here threaded adjacent opposite end portions thereof, and each bar 12 when mounted between a pair of support plates 13, plates 13 being integrally rigidly associated with frame 11, each end of each bar 12 being secured to a support plate 13 by nuts 14 threadably secured thereover.

Apparatus 10 incorporates a first carriage assembly which is herein designated in its entirety by the numeral 16. The carriage assembly 16 is adapted to reciprocatorily move vertically between respective upper and lower positions relative to frame 11, the upper position being shown, for example, by the dotted lines 17 in FIG. 6, and the lower position being shown, for example, by the dotted lines 18 in FIG. 6. The carriage assembly 16 itself incorporates a rectangular carriage frame 19 here formed of angle iron sections, or the like as desired, which are welded together, or the like, at positions of jointure. Frame 19 can have any convenient structural configuration for use in this invention.

To permit carriage subassembly 16 to have the capacity for such reciprocal movements, a series of four circumferentially grooved bearing wheels 26 are provided, wherein the groove on each wheel 26 is preferentially cross sectionally hemicircular as in apparatus 10. Two such wheels 26 are mounted in spaced relationship to each other on each lateral side of carriage frame 19. Each wheel 26 is journalled for rotational movements on a bearing wheel shaft 27. The shafts 27 are mounted to carriage frame 19 so as to rigidly project therefrom in a transverse but spaced parallel interrelationship to one another. The location of the shafts 27 relative to the bars 12, and the grooving on wheels 26, is such that, when the wheels 26 are functionally associated with the shafts 27, the wheels 26 are adapted to circumferentially engage cylindrical surface portions of the bars 12 matingly and rotatably. When the carriage subassembly 16 reciprocatorily moves, the wheels 26 roll axially and longitudinally over their associated bar 12. Two wheels 26 are preferably provided for reasons of stabilization along each lateral side of the carriage frame 19 in a vertically spaced interrelationship to one another. The bearing wheels 26 in apparatus 10 are conveniently to one another. The bearing wheels 26 in apparatus 10 are conventiently retained on shafts 27 by means of nuts 28 threadably received over the open or terminal end of each shaft 27, or otherwise as desired.

A second carriage subassembly 29 is also incorporated into apparatus 10 which is preferably (as shown) supported within first carriage subassembly 16. Carriage 29 is defined by a transversely extending angle iron section 31 in apparatus 10 and has welded or otherwise secured to opposed end portions thereof a pair of support plates 32 which vertically project from the opposed ends of section 31 in axially parallel relationship relative to bars 12. In order to permit the carriage 29 to reciprocatorily vertically move relative to frame 11, the carriage 29 is provided with four bearing wheels 25, which are here similar to wheels 26 in structure and location relative to carriage subassembly 29, and which are located two on each end region of carriage 29, each wheel 26 being journalled for rotational movement on a bearing wheel shaft 34. The bearing wheel shafts 34 are each rigidly associated with their associated support plate 32 in vertically spaced relationship to one another. Thus, a stabilized capacity for vertical reciprocal movements of the carriage 29 along portions of the track bars 12 is provided in a manner analogous to that provided for the carriage 16. The upper position for carriage 29 is shown by solid lines in FIG. 6 while the lower position for the carriage 29 is shown by the dotted lines 36 in FIG. 6. Carriages 16 and 29 are here disposed substantially between bearing bars 12.

Reciprocal movements of carriage assembly 16 between its upper position 17 and its lower position 18 are effectuated by the means of a pneumatic cylinder assembly 58. The terminal end of the cylinder body or housing 58A (FIG. 6) of cylinder assembly 58 is pivotally suspended from an upper cross member of frame 11 by means of a rod 59 whose lower end is joined to a clevis 60 of cylinder assembly 58 by a rivet 61, or the like, pivotally engaging clevis 60 and rod 59. The rod 59 is threaded over more than one half its length from its upper or terminal end so that the rod 59 can be used to adjust the height of the cylinder assembly 58, and hence the reciprocal movements upwards and downwards which can be effectuated by the cylinder assembly 58. Cylinder assembly 58 is provided with an extensible and retractable shaft 62 whose lower end is threaded and provided with nuts (paired) 63, and such lower end of shaft 62 is interconnected through a flanged portion of transverse member 23 of carriage frame 19 at a mid portion thereof by means of the nuts 63. The cylinder assembly 58 is of the double acting pneumatic type resulting in driven extension and retraction movements of the shaft 62 thereof responsive to cylinder air pressures. Thus, carriage 16 reciprocates relative to frame 11 along bars 12.

Reciprocal movements for carriage assembly 29 are produced by a cylinder assembly 64 whose operation and structure can be similar to that for cylinder assembly 58. The forward end of the cylinder body or housing 64A (FIG. 6) of cylinder assembly 64 is secured by a mounting nut 64B to arm 19A, arm 19A being itself welded to a mid portion of transverse member 23 of carriage frame 19 so that the entire cylinder assembly 64 reciprocally moves with the carriage frame 19. Cylinder assembly 64 is provided with a shaft 66 whose terminal portion is threaded circumferentially and such end is connected to a mid-portion of the section 31 of sub-carriage 29 and is secured thereto by means of a pair of nuts 67. Like the cylinder assembly 58, the cylinder assembly 64, is of the double acting pneumatic type so that shaft 66 is reciprocatorily driven in response to cylinder air pressures. Thus carriage 23 reciprocates relative to carriage frame 19 and bars 12. Any convenient cylinder assembly mounting means may be employed for cylinder assemblies 58 and 64.

A pair of four-way fluid valves 107 and 108 (FIG. 4) are provided, valve 107 being adapted to operate cylinder assembly 58, and valve 108 being adapted to operate cylinder assembly 64 (FIG. 8), each through associated interconnecting tubes 65. The respective rollers 107A and 108A of conventional valves 107 and 108 are conventionally spring loaded into positions of outward, extension against the face of respective cam 102 and 103. Reciprocal movements of these rollers 107A and 108A cause reciprocal movement of the functionally associated valve spools to direct pressures to an appropriate cylinder 64 or 58 for the respective carriage movement.

Control means for operating valves 107 and 108 in a predetermined sequence is provided, as hereafter illustrated, thereby regulating respective reciprocal movements of the individual carriages 16 and 29, as desired. Any convenient such control means may be employed, such as one of a mechanical, fluidic, electrical, or mixed character, as those skilled in the art will appreciate.

Apparatus 10 is provided with a closed loop conveyor system which is herein designated in its entirety by the numeral 80. Conveyor system 80 utilizes a pair of endless drive chains 86 which are mounted about the peripheries of two pairs of longitudinally spaced sprockets 87A and 87B, the sprockets 87A being keyed to opposite ends of shaft 88A, and the sprockets 87B being keyed to opposite ends of shaft 88B so that chains 86 translatably move about a predetermined path of travel. A plurality of longitudinally spaced, transversely flattened, aligned slat members 83 extend across the distance between the chains 86 and are secured thereto, as by welding or the like, thus permitting slat members 83 to translate with chains 86. The interrelationship between frame 11 and conveyor system 80 is such that once during each complete traversal of such path of travel by each slat member 83, and outside facial portion of each slat member 83 comes into one position of general end alignment with the carriages 16 and 29 and with each one of a pair of predetermined opposed side edge locations on each slat member 83, such as locations 90 on slat member 83A (FIG. 4), being generally equally spaced from an end region of a different adjacent one of the bearing bars 12. Any convenient construction can be employed for the closed loop conveyor system 80, as those skilled in the art will appreciate. A drive means is provided, as hereinafter illustrated, for moving translatably the chains 86 in a stop and go manner; any convenient such drive means may be employed.

Control means for operating the drive means of the conveyor system 80 in a predetermined sequence is provided as hereinafter illustrated, thereby regulating movements of slat members 83 so that predetermined ones thereof are each individually locatable in such one position in a substantially stationary manner during a predetermined sequence of reciprocal movements of the carriages 16 and 29, as desired. Any convenient such control means may be employed, such as one of a mechanical, fluidic, electrical, or mixed character.

Preferably, in such an apparatus 10, the carriages 16 and 29 are each generally flattened in the region between the bearing bars 12, and carriage 16 has a frame 19, and the carriage 29 reciprocates within carriage 16.

Such an apparatus 10 can be used in a number of different end use applications for performing a plurality of operative functions simultaneously upon each individual one of a plurality of stations arranged in a row, as for processing fruit pieces or the like, each row being sequentially advanced into a machine position for such a performing of such operative functions, stopped in such position, and then advanced out of such machine position when such functions have been performed. An illustration of one such application situation for such an apparatus is hereinafter described.

Referring to the drawings, especially FIGS. 3 through 7, there is seen an embodiment of a synchronized multiple row fruit coring and advancing apparatus of this invention which is herein for convenience designated in its entirety by the numeral 10.

An electric motor 92 interconnects with a transmission 93, in an interconnected housing arrangement, and transmission 93 drives a shaft 94 on the terminal end of which a sheave 96 is keyed. Motor 92 and transmission 93 are mounted on frame 11 stationarily by a bracket (not detailed).

A shaft 97 transversely extends across and through frame 11, and is journalled adjacent its opposed end regions by a pair of bearing blocks 98. The blocks 98, in turn, being secured to frame 11 by bolts or the like (not shown). On one end of shaft 97 and keyed in alignment with sheave 96 a pulley wheel 99 is located. A V-belt 106 transfers power from sheave 96 to sheave 99 thereby rotatably driving the shaft 97 and turning a drive crank 101 adjustably affixed to shaft 97 (for initial turning of the conveyor drive). Drive crank 101 is, in turn, interconnected to one end of the lever arm 91 by bearing block 115 (see FIG. 4).

Shaft 88A at one end thereof is adjustably affixed to a ratchet (not detailed). This ratchet in turn is effective to turn the drive wheel 89 for driving chains 86 of conveyor system 80 in a proper desired timing sequence relative to other machine functions. Lever arm 91 is journalled for oscillatory movements to one side of wheel 89 on shaft 95.

The extent of movement of the lever arm 91 is limited by the diameter of revolution of lever arm 91 at the axis of the rotatable connection thereof to shaft 114 on the crank 101, as those skilled in the art will appreciate. A ratchet arm and drive pawl arrangement (not detailed) associated with the lower end region of lever arm 91 connects with ratchet teeth (not detailed) on the perimeter of drive wheel 89. Thus, the continuous rotational movement of shaft 97 is converted to a stop and go movement for shaft 88A, as desired.

There is thus provided for apparatus 10 a stop and go power transfer means for coupling driven shaft 97 with conveyor drive shaft 88A and for converting a continuous rotation of driven shaft 97 into a discontinuous rotation of conveyor drive shaft 88A. Thus, for a predeterminable number of degrees of rotation of the driven shaft 97, the conveyor drive shaft 88A rotates a predeterminable number of degrees, and for the remaining degrees of rotation of the driven shaft 88A up to 360° of rotation thereof the conveyor drive shaft 88A is stationary, thereby causing the closed loop conveyor system 80 to exhibit predetermined discontinuous stop and go advancing movements along its path of travel. Such movements are regulated by rotational movements of the driven shaft 88A. Any convenient stop and go power transfer means or conventional timing mechanism apparatus 10 to synchronously drive the conveyor. One suitable and presently preferred such mechanism is the improved ratchet drive and indexing arrangement shown and described in my copending U.S. patent application Ser. No. 958,177 filed on even date herewith which is particularly suitable for transfer of power from shaft 97 to shaft 88A in the preferred practice of the present invention.

In apparatus 10, a series of four fruit holder cups 81 is secured to each slat member 83 of conveyor system 80 in a row. The slat members 83 are themselves spatially located in a predetermined relationship to one another longitudinally and parallelly at regular intervals along the endless drive chains 86.

The movement of each slat member 83 for each row of fruit holder cups 81 is so regulated and adjusted that as a consequence of such stop and go movement, the individual rows of fruit holder cups are aligned generally with the axes of the coring knives 44 when the conveyor system is in a stop configuration. The fruit holder cups 81 are loadable by hand or mechanically (not shown) with fruit members 84, the individual slat members bringing each row of fruit holder cups into a horizontal configuration. The individual rows of fruit holder cups 81 thus sequentially move row by row across frame 11 horizontally and finally come into alignment with the individual coring knives 44 as part of a single sequence of operations of apparatus 10. This sequence is repeated indefinitely during normal operation of the apparatus 10.

In apparatus 10 the desired sequence of operations of carriages 16 and 29 is synchronized with rotation of driven shaft 97 through the use of a pair of cams 102 and 103, which are circumferentially mounted about the shaft 97. A lobe of each of these cams 102 and 103 is adapted to compress the cam follower actuating roller 107A and 108A, respectively, of valves 107 and 108. Thus, valve 107 controls air flow through a different one of the two chambers of double acting cylinder 58 and valve 108 controls air flow through a different one of the two chambers of cylinder 64, in response to the position and shape circumferentially of the lobes of the individual respective cams 102 and 103, so that operasecured to its associated coring shaft 39 by means of a set screw 46 but any convenient securing means can be employed. It is preferred to have all centers of coring knives 44 transversely aligned laterally across apparatus 10.

A motor 47 (FIGS. 3 and 5) is mounted to a bracket 50 which is supported by carriage frame 19 of the carriage subassembly 16. Motor 47 is so oriented that a sheave 48 keyed to the drive shaft 49 of motor 47 is horizontally aligned with the sheaves 41 so that the belts 42 and 43 are drivable by motor 47. The arrows associated with the individual sheaves 41 and 48 show the individual directions of rotational movement thereof, respectively, during operation of apparatus 10. Thus, the coring shafts 39 and their respective associated coring knives 44 are adapted for rotation each at a relatively high rate (typical knife rotational speeds falling in the range of from about 1000 to 2000 rpm), the exact speed of any given coring shaft 39 being dependent upon the speed at which the drive shaft 49 turns as well as upon the diameter of the particular sheave 41 associated with an individual coring shaft 39, as those threadably mounted about the upper end of each rod 51. Each spring 56 thus provides a shock absorbing function against withdrawal resistance pressures applied to the lower respective end of its associated rod 51 during withdrawing operations involving rods 51, which is desirable but not essential to operation of apparatus 10, as those skilled in the art will appreciate.

Each coring knife 44 is provided with a fruit holder assembly 68. Each fruit holder assembly 68 incorporates a central concavely shaped spherical segment plate 69 formed of cast aluminum or the like. The interior radius of curvature associated with each spherical segment plate 69 is adapted to permit segment plate 69 to mate generally with the radius of curvature of a predetermined class of fruit members, such as oranges, grapefruit, or the like, as desired. Each spherical segment plate 69 is provided with and fixed to a horizontally oriented mounting or base plate 71 (FIGS. 3 and 4) which has laterally outwardly extending projections from opposed sides across an outer upper side of each segment plate 69. An aperture 72 extends radially through the central region of each segment plate 69 and also centrally through the base plate 71. The diameter of the aperture 72 is great enough to permit each segment plate 69 to be positioned circumferentially around a different coring knife 44 in proximately spaced relationship thereto. To hold each segment plate 69 in such a desired relationship to its associated coring knife 44, each plate 71 has its extensions each fitted to receive the lower end of each one of a pair of guide rods 73. Guide rods 73 extend in spaced parallel relationship to one another between opposed edge portions of the base plate 71 (at the lower ends of rods 73) and a transversely extending segment bracket 74 and along at upper side portions of each rod 73. There is fixedly mounted one segment bracket 74 for each coring knife 44 (secured by welding or the like to cross member segment 21). The segment brackets 74 are suitably transversely spaced from one another on cross member 21.

The lower ends of each pair of guide rods 73 slidably extend through apertures formed in side edge portions of each base plate 71. Downward travel of each base plate 71 relative to its associated rods 73 is limited by nuts 76 threaded onto the bottom of each rod 73. In spaced relationship to the bottom end of each rod 73 is secured (as by a set screw or the like) a collar 77. Between each collar 77 and the base plate 71 associated therewith a coiled biasing spring 78 is located. By this arrangement, some yielding spring biased movement of each plate 71 relative to associated rods 73 is achieved. This construction performs a damping effect to prevent vibration between the plate 71 and the rods 73. Compensation for possible size variations in different fruit pieces is taken care of by the "floating action" of rods 73 affixed to segment plate 69 sliding through guide sleeves 79.

Each of the rods 73 for each segment plate 69 is slidably suspended from the carriage subassembly 16 (and segment brackets 74 thereof, specifically) adjacent the respective upper ends of the respective guide rods 73. For this purpose, from each segment bracket 74 a pair of hanger guides 79 depend fixedly, each hanger guide 79 being in spaced parallel relationship to the other thereof and being adapted to circumferentially hold for longitudinally sliding movement with respect to each rod 73 a different guide rod 73. A collar which is adjustable but is normally fixed, extends around the upper end of each guide rod 73 limit the extent of sliding travel downwardly of each of the rod 73 relative to its associated hanger guide 79. Gravity thus normally maintains the rods 79 at rest against upper ends of the hanger guides 79 when the carriage subassembly 16 is in its uppermost position 17 in apparatus 10. The segment plate 69 is thus held against rotational movements by rods 23.

When and as the carriage 16 is moved downwardly to its alternate lower position 18 (FIG. 6), each fruit holder assembly 68 is also moved downwardly towards and in general axial alignment on individual fruit holder cup 81, the location of each fruit holder cup 81 in each slat member 83 being chosen for this effect. Each fruit holder cup 81 can be formed of cast aluminum or the like and has a spherical concave portion defined therein which is adapted to mate with the spherical segment plate 69 located thereover. The bottom central portion of each fruit holder cup 81 has radially defined therein an aperture 82 which is similar in diameter to aperture 72, the apertures 72 and 82 being axially aligned with one another so that each coring knife 44 can be extended therethrough axially. As indicated, in apparatus 10 four fruit holder cups 81 and mating segment plates 69 are provided, one for each coring knife 44.

Each pair of fruit holder cups 81 and segment plate 69 is thus adapted to hold an individual fruit member 84 therebetween. As carriage 16 is downwardly moved, a fruit member 84 is grasped therebetween by a force equal to the weight of the holder assembly 68, approximately. When fruit contact is achieved by holder assembly 68, it no longer descends with the carriage 16, and the rods 73 of each assembly 68 remain stationary in space but slidably move through their respective associated hanger guides 79, respectively, so that in effect, the rods 73 of each assembly 68 provide a means for achieving lost motion of each fruit holder assembly 68 relative to the carriage 16 after fruit contact is achieved, as those skilled in the art will appreciate. Also, the rods 73 coact with the segment 69 and the fruit holder cups 81 to provide a stabilizing means preventing rotational movement of individual fruit member 84 grasped therebetween when (subsequently) the rotating coring knives 44 are advanced through apertures 72 and 82 and through a fruit member 84, as explained below.

Thus, as the carriage subassembly 16 continues to descend, the individual rotating coring knives 44 are moved downwardly, and are driven into and through the individual fruit members 84 grasped between adjacent pairs of fruit holder cup 81 and spherical segments 69. The core (not detailed) of each fruit member 84 is received into and retained within each coring knife 44 adjacent the end thereof. When the carriage subassembly 16 has descended to, and is in its lowermost position 18, the end of each coring knife 44 extends completely through each fruit member 84, and also preferably through fruit holder cup 81 associated therewith to an extent such that each coring knife 44 preferably protrudes somewhat through a bottom of each fruit holder cup 81 in a manner such as is generally shown, for example, by the dotted lines shown in FIG. 6. At this position shaft 62 is at its maximum extension.

With each coring knife 44 thus fully extended through each fruit holder cup 81, and with each coring knife 44 rotating, the subcarriage 29 is activated by cylinder assembly 64 and shaft 66 moves the subcarriage 29 downwardly at an accelerated rate of speed, far too fast to be achieved by a mechanical cam system thereby causing the rods 51 to axially move downwardly interiorly of each coring shaft 39. When the bottommost end of each rod 51 engages a core retained in each coring knife 44, it drives such core from such coring knife 44. When each lower end of each rod 51 is moved at least to the bottom of each coring knife 44, and preferably a short ways beyond same (such as shown in FIG. 6) shaft 66 is at its maximum extension, and air flow to each of cylinder assembly 64 and to cylinder 58 is reversed so that the shafts 62 and 64 are retracted, the rods 51 are moved upwardly interiorly relative to the respective coring knives 44 and coring shafts 39, and the coring knives 44 are withdrawn from each fruit member 84 and a full coring and core removal operation cycle is completed. As the carriage subassembly 16 upwardly moves, the rods 73 slide in guides 79 until the respective collars at the upper ends of the guide rods 73 engage the adjacent hangers 79. Continued upward movement of the carriage subassembly 16 causes each fruit holder assembly 68 to be lifted away from the now cored fruit member 84.

When the cored fruit members 84 are freed of apparatus carried by carriages 16 and 29, the conveyor chains 86 are ready to be advanced to bring a fresh row of fruit members 84, each in an individual fruit holder cup 81, into a stationary working position beneath carriages 16 and 29, and to remove the cored fruit members from such working position.

After such a coring operation, core members are expelled from each knife 44 onto a conveyor 116, or the like, via a shute 117 (FIG. 3). As the chains 86 advance the rows of slat members 83 forwardly, gravity empties cored fruit from the cups 81. Thus, the apparatus 10 can operate continuously to core fruit members 84.

As noted from the preceding description, no provision for achieving spatial orientation of individual fruit members is provided. If desired, individual fruit members may be oriented by hand. However, exact orientation is not necessary because by making the bore diameter of each coring knife 44 large enough to encompass the area where most of the seeds would be, the seeds common to a given fruit type can be effectively removed. Cores can be collected and squeezed for juice reclamation, if desired (not shown). Cored fruit can be conveyed to a sectionizing operation (not shown).

In order to improve the stability and balance the forces involved in vertical reciprocal movements of the carriage subassembly 16, respective pairs of springs 111 (FIGS. 3 and 4) are preferably located at each lateral side of the carriage subassembly 16. The lower end of each spring is attached to a horizontal leg 111a mounted to the carriage subassembly 16. The upper end of each of the springs 111 is rigidly secured to the frame 11. Thus, as the carriage 16 moves downwardly, the springs 111 are stretched, and as the carriage subassembly 16 moves upwardly, the springs 111 contact and assist the upward movement. The upper end of each spring 111 is stationary, and the lower end thereof is reciprocates with the carriage 16. These springs 111 tend to offset the force of gravity and to reduce the operating load upon the cylinder assembly 64. Also, the springs 111 serve to make the loads on carriage 16 more uniform during operation of the apparatus 100.

It is necessary to regulate the speed of carriages 16 and 29 during the portion of the operating cycle of machine 10 in which the carriages 16 and 29 are performing their required functions. Referring to FIG. 8, for example, when the lobe of the cam 103 is in position to depress cam follower roller 108A, air follows the path depicted by the arrows shown in FIG. 8. To control the speed with which rod 66 is extended it is only necessary to regulate conventional flow control valve 121 to restricting the exhaust flow of air if or when a slower speed is required. Alternatively, the speed can be increased by opening the needle of the flow control valve 121 to allow increased exhaust air flow. When the cam 103 has moved to a valve operative position (not shown, but the reverse of the shown) the air flow (shown by arrows) is reversed and the rod 66 is retracted. Speed control for retraction is analogously via flow control valve 120.

From the preceding description it will be appreciated that coacting carriages 16 and 29 together with elements associated therewith can form a very useful subassembly adapted for incorporation into apparatus for coring a plurality of fruit members simultaneously.

Coring apparatus of the present invention is adapted for the simultaneous coring of a plurality of fruit members. This apparatus includes a novel subassembly comprised of carriages 16 and 29, bars 12, wheels 26 and 27, frame 11, cylinders 58 and 64, and associated fluid supply and control means. This subassembly apparatus can be used in a plurality of fruit processing machines in accordance with the needs of a particular processing situation.

Referring to FIGS. 9 through 15 there is seen an embodiment wherein fruit processing apparatus of the present invention is adapted for use in the coring of bell peppers. This embodiment being designated in its entirety by the numeral 200. Apparatus 200 incorporates a frame 201 formed of angle iron sections or the like which are welded together or the like, at positions of jointure. Frame 201 supports and rigidly mounts a pair of vertical cross sectionally circular bearing bars 202, each bar 202 being in spaced parallel relationship to the other thereof. In apparatus 200, the bars 202 are normally vertical. For purposes of mounting bars 202 to frame 201, each bar 202 is here threaded in a manner similar to bar 12 at opposite end portions thereof and each bar 202 is mounted between a pair of support plates 203, the plates 203 being integrally rigidly associated with frame 201, each end of each bar 202 being secured to a support plate 203 by nuts 205 or the like.

Apparatus 200 incorporates a first carriage assembly which is herein designated in its entirety by the numeral 206. The carriage assembly 206 is adapted to reciprocatorily move vertically between respective upper and lower positions relative to frame 201 the upper position being shown for example, in FIG. 10 and the lower position being shown in FIG. 9. The carriage assembly 206 itself incorporates a rectangular frame 209 here formed of angle iron sections or the like, as desired, which are welded together, or the like, at positions of jointure. Frame 209 can have any convenient structural configuration, as those skilled in the art will appreciate.

To permit the carriage subassembly 206 to have the desired capacity for reciprocal movements, a series of four circumferentially hemicircularly grooved bearing wheels 210 are provided, there being two such wheels 210 mounted on each lateral side of the carriage frame 209 and the wheels 210 being journalled for rotational movements. The wheels 210 are adapted for vertical tracking movements along each of the bars 202 with the wheels 210 circumferentially engaging cylindrical opposed surface portions of the bars 202.

A second carriage subassembly 211 is also incorporated into apparatus 200 and is here shown to be spatially located within the first carriage subassembly 206. The second carriage subassembly 211 incorporates a transversely extending angle iron section 212, or the like, and has welded or otherwise secured to opposed end portions thereof a pair of plates 213 which are positioned so as to be generally in an axially parallel relationship to the bars 202. To permit the carriage 211 to reciprocatorily vertically move relative to the frame 201, the carriage subassembly 211 is provided with four bearing wheels 214 which are similar to wheels 210 and are likewise journalled for rotational movement relative to the frame 212. The wheels 214 are likewise guided by the bars 202 for reciprocal movements of the carriage subassembly 211 analogously to the movements of the first carriage assembly 206. Observe that the second carriage assembly 211 is adapted for movement with the first carriage subassembly 206 along the bars 202.

The carriage subassembly 206 is reciprocally moved between its respective upper and lower positions by a pneumatic cylinder assembly 215 whose operation and structure can be considered to be analogous to that of the pneumatic cylinder assembly 58. Similarly, the second carriage assembly 211 is reciprocatorily moved by means of a pneumatic cylinder assembly 216 whose operation and structure can be considered to be similar to that for cylinder assembly 64.

A gear reducer motor assembly 217 drives a belt 218 which, in turn, rotatably drives a sheave 219. Sheave 219 is, itself, drivably associated with a cross drive shaft 220 which is journalled for rotational movements relative to frame 201 and in a manner similar to that utilized for the shaft 97. Mounted upon the shaft 220 are cams 221 and 222. Mounted on the opposite end of the shaft 220 is a crank 223 which is adapted to impart a stop and go drive similar to that above referenced and described for lever arm 91, the analogous lever arm here being designated by the numeral 224.

Each cam 221 and 222 functions to operate in a predetermined sequence a four-way valve 225 and 226, respectively. Each valve 225 and 226 is functionally associated by pneumatic lines 227 with the respective cylinder assemblies 215 and 216, respectively, so that the same can be operated as desired in a manner analogous to that achieved with the cylinders 64 and 58. The adjustment provisions for the respective valves 225 and 226 can be considered to be similar to that achieved for the apparatus 10 (see description re FIG. 8 above).

Apparatus 200 is provided with a closed loop conveyor system which is herein designated in its entirety by the numeral 227 whose operation and construction can be considered to be analogous to the conveyor system 80.

The apparatus 200 is provided with a plurality (here four) of coring units, each unit being herein designated in its entirety by the numeral 228. Each unit 228 is drivably attached to a hollow drive shaft 229 (there being four shafts 229). The shafts 229 are mounted in transversely spaced relationship to one another to carriage frame 209 by means of respective bearing blocks 230, the bearing blocks being secured to the frame 209 by nut and bolt assemblies 231 or the like as desired. Thus, each shaft 229 is supported by two bearing blocks 230. Thus, the shafts 229 are adapted to be simultaneously reciprocally moved by the carriage subassembly 206 towards and away from the common working location.

Each coring unit 228 incorporates a pair of cutting blades 232. Each pair of coring blades 232 is pivotably mounted to a cylindrical base member 233 by an attachment member 234. Each attachment member 234 is provided with a radially inwardly disposed cam surface 235 which angles inwardly towards its top portion thereof (see FIG. 12, for example). A spring biasing member 236 wraps circumferentially about the upper portion of the attachment member 234, the member 236 being conveniently seated in grooves 237. Thus, the blades 232 are normally biased in the open posion depicted in FIG. 12 wherein adjustable stop members 238 limit the extent of the open position assumable by the blades 232. An actuator rod 239 axially extends through the hollow shaft 229. The shaft 239 beng adapted for reciprocal axial movements within the shaft 229. The shaft 239 (there being four in all) is carried on the second carriage assembly 211 for vertical movement therewith. A collar 240 is fixed about each shaft 239. Each collar 240 abuttingly engages an upper surface of angle iron frame 212. The upper end of each shaft 239 projects above its associated collar 240 and is circumferentially provided with a coiled spring member 241, in each instance. An upper collar 242 secured adjacent the upper end of each shaft or rod 239 retains the spring 241 in its desired position thus reciprocal movements of the rods 239 are regulated by reciprocal movements of the second carriage assembly 211 while the reciprocal movements of the hollow shafts 229 are regulated and controlled by the reciprocal movements of the first carriage assembly 206. At the end of each rod 239 which is disposed interiorly between each pair of blades 232 a plug 243 is provided whose circumferential dimensions are such as to result in engagement with the cam surfaces 235 upon an upward movement of the rod 239 thereby resulting in desired opening and closing movements of the blades 232. The structure and details of each coring unit 228 are as generally described in my earlier U.S. Pat. No. 3,563,289.

In apparatus 200, the operational sequence is briefly explained as follows: Starting from the up position shown in FIG. 10 for first carriage assembly 206 the second carriage assembly 211 is moved into an upper position (not detailed, but the upper position results in the configuration for coring unit 228 shown in FIG. 12). The conveyor system 227 advances a row of bell peppers 244 into working locations, the bell peppers 244 being supported and positioned by holders 245 in each instance. Suitable construction for the holders 245 is provided by the Altman U.S. Pat. No. 4,112,837 issued Sept. 12, 1978. With the holders immediately below an axially aligned with each of the shafts 229, the conveyor system 227 is stopped. The mechanism for achieving stop and go action of the conveyor system 227 is as above referenced. Now, the coring units 228 are advanced downwardly towards individual bell peppers 244 through operation of the cylinder assembly 215. As this descent occurs, an initial contact between each bell pepper 244 is achieved with a guide plate 246 whereupon the peppers 244 are held or secured against rotational influences. Immediately after the plate 246 comes to rest on each pepper 244 the blade pair 232 descends through plate 246 and enters each pepper 244. The blade pair 232 of each unit 228 is rotating around its axis. To achieve such rotation, each shaft 229 is drivably associated with a sheave 247. Belt means 248 circumferentially engages the sheaves 247 as well as the drive sheave 249 which, in turn, is driven directly by a motor 250. In operation and function this means for rotation is similar to that above described in reference to apparatus 10 (see, for example FIG. 5).

The rotating blade pair 232 of each unit 228 descends into each pepper 244 until the blades surround circumferentially the core portion 251 of the associated pepper 244. Having arrived at the proper penetration depth into each bell pepper 244 the plug 243 is elevated relative to the blades 232 through operation of the assembly 216 which elevates the rods 239. The plug 243 works against the cam faces 235 to cause the blades 232 to clamp about the core 251 as seen for example in FIG. 13. The movement radially of the blades 232 is against the bias of the spring member 236. As a result, the core 251, in each instance, is disengaged from the pepper 244. At this point in operation, the blades 232 are removed from the peppers 244 through operation of the cylinder assembly 215 which moves the main carriage 206 to its upper position with each core 251 still being retained within the blade pair 232 of each unit 228. After the assembly has reached its upper position (as predetermined by an appropriate arrangement of the cams, the conveyor system 227 is actuated and the row of now cored peppers is advanced out from under the working location). After the conveyor system 227 has moved the row of peppers to a position which is clear of the axes of the units 228, the plug 243 of each unit 228 is lowered through operation of cylinder 216, thereby unclamping each blade pair 232 from the engaged core 251. This results in a release of each core 251 from its associated blades 232 and the core 251 drops by gravity downwardly. In addition, the plug 243 moves downwardly to an extent sufficient to disengage each core 251 from blades 232 should any sticking or adherence therebetween be realized. Each core 251 falls in between a row of cored peppers and a row of adjacent peppers being moved into position for a coring operation. The cores 251 descend until they reach a collection chute 252 which, in turn, guides the cores 251 to a discharge location. At this time, the configuration of apparatus 200 is generally as shown, for example in FIG. 10.

Observe that as the knives 232 descend into a pepper 244, the plug 243 is being raised at a rate whereby, when the blades have descended into a pepper 244 to the desired depth, the plug 243 enters into engagement with the cam surfaces 235 so that the desired cooperation between components is achieved and this cooperation, as those skilled in the art will appreciate, can be adjusted or regulated by the contours of the cams 221 and 222 and also by the control valves associated with the four-way valves (above described).

The apparatus of this invention preferably includes means for positioning an individual fruit member generally axially relative to each one of such coring knives. Means for simultaneously axially longitudinally advancing the cutting edge of each of the so-rotating plurality of coring knives is included so that such coring knives can be moved into and through each of the fruit members.

The present invention, in its use of a combination of fluid cylinder means four-way control valves, flow metering valve means (associated with such four way control valves), and timed cam lobes provides not only operational rapid advance speed characteristics, but also provides for infinite variability of cylinder adjustment, including dwell times capability. Variable dwell time is typically a parameter of machine operation which is not readily achievable in a simple adjustment manner with mechanical drive arrangements. For example, it is important in a given coring operation to regulate the advance of a coring knife into a fruit member at a work station immediately following the advance of such fruit member into the work station position. The exact timing relationship here can be extremely difficult to adjust with mechanical drive elements particularly in a relatively high speed machine operating mode. Increases in machine speed can only be achieved by adjusting and fine tuning of the relative speeds of operation of the individually moving machine subassemblies. In addition, the arrangement here provided utilizing this combination in further combination with a bearing bar pair, two reciprocal frames, and bearing wheels, permits one to achieve a degree of precision and reliability in a simple and low cost manner not heretofore achievable. In prior art mechanical systems, the degree of precision involved, coupled with alignment problems militate against achieving results approaching those routinely and characteristically obtained in this invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto-appended claims.

I claim:

1. Processing apparatus for coring fruit or the like which comprises in combination
   (A) stationary frame means,
   (B) a pair of spaced, parallel elongate track bar means supported by said stationary frame means and extending generally from a working region definable therebetween and adjacent an end region thereof, opposed surface portions of said track bar means being of cross-section to provide elongate trackways,
   (C) a first and a second carriage subassembly, each said carriage subassembly including a carriage frame means disposed generally in a spatial region between said track bar means and having a plurality of associated bearing wheel means for engaging said trackways and for reciprocally moving the respective associated carriage frame means longitudinally along said track bar means,
   (D) a first and a second fluid cylinder means, said first fluid cylinder means being connected to and extending functionally between said stationary frame and said first carriage subassembly, and said second fluid cylinder means being connected to and extending functionally between said first carriage subassembly and said second carriage subassembly, said first fluid cylinder means being adapted to move said first carriage subassembly reciprocatorily relative to said stationary frame means along said track bar means, and said second fluid cylinder means being adapted to move said second carriage subassembly reciprocatorily relative to said first carriage subassembly along said track bar means,
   (E) first and second fluid valve means for controlling operation of said first and second fluid cylinder means for operating said first and said second carriage subassemblies, respectively, including conduit interconnecting means therefore, (F) control means for operating said first and said second fluid valve means in a predetermined sequence to regulate respective reciprocal movements of said first and said second carriage subassemblies, (G) said first carriage subassembly mounting:
  (1) a plurality of rotatable hollow fruit coring knife means including mounting means therefor, each one of said knife means including bearing means therefor,
  (2) each one of said knife means being adapted for rotation about an axis which is in spaced, parallel relationship to the axis of each one of said track bar means, and each one of said knife means projecting from an end edge portion of said first carriage subassembly and also being in spaced parallel relationship to the other knife means,
  (3) a motor means, including mounting means therefor, and a shaft driven thereby, and
  (4) a plurality of sheave means, one of each being functionally associated with each of said knife means and with said motor shaft, and endless belt means common to and interconnecting circumferential surface portions of each of said sheave means for rotatably driving each of said knife means by said motor means, (H) said second carriage subassembly mounting a plurality of rod members, including mounting means therefor, each of said rod members extending axially and reciprocably into a different one of said knife means for core removal from said knife means.

2. The apparatus of claim 1, further including a conveyor system and a second control means,
  (A) said conveyor system comprising
    (1) a closed loop conveyor belt means including frame support and bearing means therefor, said belt means being adapted to move translatably about a predetermined path of travel, said path of travel extending through said working region
    (2) a plurality of transversely flattened, aligned work piece holder means, each extending in spaced relationship to the others thereof circumferentially and longitudinally about an outside portion of said conveyor belt means including mounting means therefor and adapted to translatably move with said conveyor belt means, and
    (3) drive means, including power transfer means, for translatably moving said conveyor belt means about said path of travel, and
  (B) said second control means comprising
    (1) means for actuating and deactuating said drive means, and
    (2) control means for operating said actuating and deactuating means at a predetermined time interval relative to said operational sequence of said first and said second fluid valve means.

3. The apparatus of claim 1 wherein each one of said knife means has associated therewith a fruit support means.

4. The apparatus of claim 1 wherein said fluid cylinder means are pneumatic.

5. Apparatus for performing a plurality of sequential operative functions in a processing sequence for fruit or the like simultaneously at each individual one of a plurality of processing stations for removal of core or the like arranged in a row, each row being sequentially advanced into an apparatus position for such a performing of such operation functions, stopped in such position and then advanced out of such apparatus position when such functions have been performed, said apparatus comprising:

(A) a stationary supporting frame means,
(B) a pair of spaced, parallel track bar means supported by said stationary frame means,
(C) a first and a second carriage subassembly each disposed generally in a spatial region between said track bar means,
(D) respective pluralities of first and second rotatable bearing wheel means, each including shaft means and mounting means therefor, said first bearing wheel means being mounted to said first carriage subassembly, and the second bearing wheel means being mounted to said second carriage subassembly, each of said bearing wheel means having grooved circumferences which matingly and rotatably engage said track bar means for movement longitudinally therealong, thereby adapting each of said first and second carriage subassemblies for stabilized, aligned longitudinal reciprocal movements relative to said track bar means with minimal functional contact between said track bar means and said bearing wheel means,
(E) a first and a second fluid cylinder assembly means, each including mounting means therefor, said mounting means for said first fluid cylinder assembly means functionally mounting said first fluid cylinder means to and to extend between said stationary frame and said first carriage subassembly, and mounting means for said second fluid cylinder assembly means functionally mounting said second fluid cylinder assembly to and to extend between said first carriage subassembly and said second carriage subassembly, said first fluid cylinder assembly means being adapted to reciprocally move said first carriage subassembly relative to said supporting frame means, and said second fluid cylinder assembly means being adapted to reciprocally move said second carriage subassembly relative to said first carriage subassembly,
(F) a conveyor system including
  (1) a closed loop conveyor belt means, including journaling means therefor, secured to said stationary frame for moving translatably through a predetermined path of travel which extends between said track bar means adjacent an end region thereof,
  (2) a plurality of fruit piece holders, including mounting means therefor, secured to said closed loop conveyor belt means in a plurality of transverse rows, such rows being longitudinally equally spaced from one another along said belt means,
  (3) belt drive means, including power transfer means for translatably moving said belt means about said path travel,
(G) first and second fluid valve means each including valve operating means, and each supported by said stationary frame, each one of said valve means being adapted to operate a different respective one of said first and said second fluid cylinder assembly means, and said valve means including conduit means functionally interconnecting said valve means with said cylinder means, (H) a source of fluid, including conduit connecting means, for said fluid valve means and said fluid cylinder assembly means, (I) a motor means, including a shaft driven thereby, (J) stop and go power transfer means for coupling said driven shaft means and said belt drive means, and for converting a continuous rotation of said driven shaft into a discontinuous operation of said belt drive means whereby, for a predeterminable number of degrees of rotation of said driven shaft means said belt drive means advances said belt means a predeterminable distance, and, for the remaining degress of rotation of said driven shaft means up to a predetermined number of degrees of rotation thereof, said belt drive means is stationary, (K) first control means for operating each of said first and said second fluid valve means, in a predeterminable sequence to regulate respective reciprocal movements of said first and said second carriage subassemblies, (L) and second control means for operating said power transfer means in a predetermined sequence relative to operations of said first and said second fluid valve means.

6. The apparatus of claim 5, wherein each of said first and said second carriage subassemblies is provided with four of respectively respective said first and said second rotatable bearing wheel means.

7. Apparatus for accomplishing fruit or like coring in two different successive operations in a single station position for a plurality of fruit pieces, comprising:

means for positioning a predetermined plurality of fruit pieces in predetermined transversely spaced relation to one another;

supporting means located operatively relative to said positioning means;

first and second carriage members mounted on said supporting means for operative reciprocal movements relative to said positioning means;

first means for pneumatically linearly moving said first carriage member and a predetermined plurality of coring members supported by said first carriage member in aligned relationship with said fruit pieces toward said fruit pieces until said first carriage member has positioned said coring members in a predetermined relationship relative to said fruit pieces:

second means comprising actuator means carried by said first carriage member for pneumatically linearly moving said second carriage member and a plurality of core removal members supported by said second carriage member in aligned cooperative relation with said first operating members and with said fruit pieces toward said fruit pieces until said second carriage member has positioned said core removal members in a predetermined relationship relative to said fruit pieces and said coring members;

and said first means being operative for pneumatically linearly moving reciprocably said first carriage member and said second carriage member away from said fruit pieces a distance at least sufficient to disengage said coring members and said core removal members from said fruit pieces.

* * * * *